United States Patent [19]

Noji et al.

[11] Patent Number: 5,470,512

[45] Date of Patent: Nov. 28, 1995

[54] PROCESS FOR PRODUCING MICROCAPSULES

[75] Inventors: Minoru Noji; Akira Kunugise, both of Takasaki; Yumiko Imai, Maebashi, all of Japan

[73] Assignee: Nippon Kayaku Kabushiki Kaisha, Tokyo, Japan

[21] Appl. No.: 120,654

[22] Filed: Sep. 13, 1993

Related U.S. Application Data

[63] Continuation of Ser. No. 820,607, Jan. 21, 1992, abandoned.

[30] Foreign Application Priority Data

May 24, 1990 [JP] Japan ................................. 2-132685
Dec. 13, 1990 [JP] Japan ................................. 2-410135

[51] Int. Cl.$^6$ .......................... B01J 13/10; A01N 25/28; A61K 9/50
[52] U.S. Cl. ................. 264/4.1; 8/426; 424/490; 427/213.3; 427/213.36; 428/402.2; 428/402.22; 428/402.24; 512/4; 514/963
[58] Field of Search ................... 264/4.1; 427/213.3, 427/213.36; 428/402.2, 402.22, 402.24; 8/526; 424/490

[56] References Cited

U.S. PATENT DOCUMENTS

| | | | |
|---|---|---|---|
| 3,409,461 | 11/1968 | Mehlo et al. | 427/215 |
| 3,639,257 | 2/1972 | Harbort | 427/213.36 |
| 3,791,987 | 2/1974 | Fanger | 428/402.24 |
| 3,826,670 | 7/1974 | Rees | 428/402.24 X |
| 3,852,076 | 12/1974 | Grasko | 106/26 |
| 3,946,134 | 3/1976 | Sherman | 428/403 |
| 4,259,445 | 3/1981 | Glass et al. | 435/178 |
| 4,349,456 | 9/1982 | Sowman | 428/402 |
| 4,461,832 | 7/1984 | Tschang et al. | 427/213.3 X |
| 4,477,492 | 10/1984 | Bergna et al. | 427/215 |
| 4,781,858 | 11/1988 | Mizukami et al. | 428/402.24 X |

FOREIGN PATENT DOCUMENTS

| | | |
|---|---|---|
| 50-62879 | 5/1975 | Japan. |
| 54-6251 | 3/1979 | Japan. |
| 54-10936 | 5/1979 | Japan. |
| 57-122931 | 7/1982 | Japan. |
| 59-222224 | 12/1984 | Japan. |
| 61-57236 | 3/1986 | Japan. |
| 62-241540 | 10/1987 | Japan. |

OTHER PUBLICATIONS

Database WPI, AN=78-27830A [15], Derwent Publications Ltd, London, GB; & JP-A-53 022 530 (Agency of Ind. Sci. Tech.) Mar. 2, 1978.

Patent Abstracts of Japan, vol. 13, No. 69, (C-569)[3417], 16th Feb. 1989; & JP-A-63 258 642 (Agency of Ind. Science & Technology) Oct. 26, 1988.

Primary Examiner—Richard D. Lovering
Attorney, Agent, or Firm—Nields & Lemack

[57] ABSTRACT

The present invention relates to a microcapsule having a core material encapsulated with a capsule wall obtained by coagulating the fine colloidal particles by using an electrolyte, and a process for producing such microcapsules. In the present invention, inorganic and/or organic colloidal particles are used as the wall material and such particles are coagulated by using an electrolyte to form the capsule wall, so that it is possible to produce the microcapsules under mild conditions and with simple operations, and in addition, even the physically and/or chemically instable core materials can be easily encapsulated.

8 Claims, 1 Drawing Sheet

AMOUNT OF METHYLOLMELAMINE IN MICROCAPSULE

- □ 0%
- ○ 1%
- ● 2%
- △ 4%
- ■ 10%

PROCESS FOR PRODUCING MICROCAPSULES

This application is a continuation of application Ser. No. 07/820,607 filed Jan. 21, 1992, now abandoned.

TECHNICAL FIELD

The present invention relates to novel microcapsules and a process for producing them.

BACKGROUND ART

Many reports have been made on the microcapsules and their production methods. Among them, complex coacervation method, simple coacervation method, interfacial polymerization method and in situ polymerization method are known as the methods for physicochemically and chemically producing microcapsules. These methods are practically used in many fields of art owing to the advantages such as no necessity of using specific devices, capability of producing the capsules of the desired particle sizes in the range from submicron level to the order of several millimeters and capability of controlling the properties and denseness of the capsule wall.

However, the coacervation methods, in which gelatin-gum arabic type natural polymers are most generally used as capsule wall material, have the defects that the capsule made of said polymeric substances are poor in water resistance and costly, that it is hard to obtain a capsule solution of high concentration, and that the encapsulization process is complicate. On the other hand, the chemical production methods such as interfacial polymerization method and in situ polymerization method have the problems that the raw material of capsule wall reacts with the core material to be encapsulated due to high reactivity of the raw material, and that the core material is exposed to a strong acid or alkali, so that these methods are not necessarily satisfactory ones.

DISCLOSURE OF THE INVENTION

As a result of strenuous studies for solving said problems, the present inventors have accomplished the present invention.

The present invention relates to:

(1) a microcapsule encapsulating a core material in a capsule wall obtained by coagulating fine colloidal particles by using an electrolyte;

(2) a microcapsule encapsulating a core material and a polymer substance in a capsule wall obtained by coagulating fine colloidal particles by using an electrolyte;

(3) a microcapsule encapsulating a clathrate of a core material in a capsule wall obtained by coagulating fine colloidal particles by using an electrolyte;

(4) a microcapsule encapsulating a core material, and a reactive monomer and/or a reactive prepolymer in a capsule wall obtained by coagulating fine colloidal particles by using an electrolyte;

(5) a microcapsule as set forth in (1), (2), (3) or (4) above, wherein the fine colloidal particles are those of an inorganic compound;

(6) a microcapsule as set forth in (1), (2), (3) or (4) above, wherein the fine colloidal particles are those of at least one substance selected from the group consisting of silicon oxide, zirconium oxide, aluminum oxide, titanium oxide, styrene polymers and acrylic polymers;

(7) a microcapsule as set forth in (1), (2), (3), (4), (5) or (6) above, wherein the electrolyte is at least one substance selected from the group consisting of chlorides, bromides, nitrates, sulfates and polyelectrolytes;

(8) a process for producing microcapsules which comprises
adding a substance to be encapsulated to a dispersion (hydrosol) of fine colloidal particles in which water is used as dispersion medium, said fine colloidal particles having zeta-potentials on their surfaces,
dispersing said dispersion in an oil medium to form an emulsion, and
adding a coagulating effective amount of an electrolyte to said emulsion so as to sufficiently neutralize said zeta-potentials and thereby cause coagulation of the fine colloidal particles in said emulsion;

(9) a process as set forth in (8) above, wherein the emulsion is a W/O emulsion prepared by adding a water-soluble substance to be encapsulated to a dispersion (hydrosol) of fine colloidal particles in which water is used as dispersion medium, and dispersing said dispersion in an oil medium;

(10) a process as set forth in (8) above, wherein the emulsion is an O/W/O emulsion prepared by adding an oil-soluble substance to be encapsulated to a dispersion (hydrosol) of fine colloidal particles in which water is used as dispersion medium to form an O/W emulsion, and then dispersing said emulsion in an oil medium;

(11) a process as set forth in (8) above, wherein the emulsion is a W(S)/O emulsion prepared by dispersing a water-insoluble powdery substance to be encapsulated to a dispersion (hydrosol) of fine colloidal particles in which water is used as dispersion medium, and then dispersing said dispersion in an oil medium;

(12) a process as set forth in (8), (9), (10) or (11) above, wherein the hydrosol is that of an inorganic compound;

(13) a process as set forth in (8), (9), (10) or (11) above, wherein the hydrosol is that of at least one substance selected from the group consisting of silicon oxide, zirconium oxide, aluminum oxide, titanium oxide, styrene polymers and acrylic polymers;

(14) a process as set forth in (8), (9), (10), (11), (12) or (13) above, wherein the electrolyte is at least one substance selected from the group consisting of chlorides, bromides, nitrates, sulfates and polyelectrolytes; and

(15) a process as set forth in (8), (9), (10), (11), (12), (13) or (14) above, wherein the substance to be encapsulated is a core material, a combination of the core material and at least one substance selected from the group consisting of polymer substances, host compounds forming a clathrate, reactive monomers and reactive prepolymers, or a clathrate of the core material.

The microcapsules of this invention can be obtained from the microcapsule producing process according to the present invention.

The present invention will be described in detail hereinbelow.

With reference to the dispersion (hydrosol) of fine colloidal particles using water as dispersion medium, the particle size of said fine colloidal particles is usually 5 to 1,000 nm, preferably 10 to 500 nm. The hydrosol may be, for instance, a sol of a metal such as gold, silver, platinum and the like; a sol of a metal oxide such as silicon oxide, zirconium oxide, aluminum oxide, titanium oxide, iron oxide, copper oxide, zinc oxide, chromium oxide and the like; a sol of a metal sulfide such as arsenic sulfide, zinc sulfide, lead sulfide and the like; a sol of other inorganic compounds such as silver halide, barium sulfate, ferric hydroxide and the like; a sol of fine particles of an organic polymer; or a sol of a mixture of said substances. An inorganic sol can be produced by a known method such as condensation method or peptization method. An organic sol can be produced by emulsion polymerizing styrene, an acrylic compound such as methyl (meth)acrylate, etc., vinyl acetate, vinyl chloride, vinylidene chloride or the like either singly or in admixture by a known method. A sol of styrene polymers or acrylic polymers is preferred. The solids content of the hydrosol is not specifically defined, and any content may be satisfactory if it is in the range where the hydrosol can be easily dispersed in an oil medium, but usually it is 5 to 50 wt %.

The substance to be encapsulated is mixed or dispersed in said hydrosol. In case the substance to be encapsulated is a water-soluble material, it may simply be mixed in the hydrosol, but in case said substance comprises an oil-soluble material or a water-insoluble powdery material, it needs to be dispersed in the hydrosol. Thus, in case the substance to be encapsulated is a water-soluble material, this material is mixed and dissolved in the hydrosol, and in case the substance to be encapsulated comprises an oil-soluble material, this oil-soluble material is dispersed in the hydrosol to form an O/W type dispersion. In the latter case, stability of the dispersion is of great importance and closely associated with the encapsulated amount of the oil-soluble material. If stability of the dispersion is bad, the encapsulated amount of the oil-soluble material also becomes low and, in some cases, it becomes perfectly impossible to encapsulate the oil-soluble material. It is preferred to use a dispersant to stabilize the dispersion. As such dispersant, there can be used a known surfactant or polymer dispersant which is capable of stabilizing O/W emulsions. However, such dispersant should not be of the type which causes coagulation of the fine colloidal particles in the hydrosol during dispersion. Typical examples of the dispersants usable for said purpose are fatty acid salts, salts of alkylsulfuric esters, polyoxyethylene alkyl ether, polyoxyethylene alkylphenol ether, polyoxyethylene sorbitan fatty acid esters, polyvinyl alcohol and carboxymethyl cellulose.

In case the substance to be encapsulated comprises a water-insoluble powdery material, the water-insoluble powdery material is dispersed in the hydrosol as in the case of the oil-soluble material. In this case, it needs to select an appropriate combination of the fine colloidal particles and the water-insoluble powdery material so that the fine colloidal particles in the hydrosol are not coagulated by the water-insoluble powdery material. For example, a combination of the fine colloidal particles and the water-insoluble powdery material having the same surface charges may be mentioned. It is also preferred to conduct a suitable treatment on the water-insoluble powdery material, such as adsorbing a dispersant on the powdery material surfaces so that the powdery material itself is not coagulated in the hydrosol. The hydrosol in which the substance to be encapsulated has been dissolved or dispersed as described above is hereinafter referred to as "primary dispersion".

As the substance to be encapsulated, there can be mentioned a core material, a clathrate of the core material, a host compound forming a clathrate, a polymer substance, a reactive monomer and a reactive prepolymer. One or more of these substances are selected as required for encapsulization.

The core material is not limited to the specific types, and a wide variety of materials such as dye, pigment, medicine, agricultural chemicals, perfume, synthetic material, adhesive, enzyme, bacterial cell, etc., can be used as the core material.

The ratio of the core material to the hydrosol in the primary dispersion is not specified, and it is possible to select any ratio that allows formation of the desired dispersion. Usually, the core material is used in an amount within the range of 0.1 to 50 wt % based on the hydrosol. The ratio of the core material to the fine colloidal particles in the hydrosol is also not specifically defined, but since it is associated with wall thickness of the capsules obtained, it should be properly regulated according to the purpose of use of the obtained capsules.

The polymer substance used together with the core material is preferably water-soluble one in the case where a water-soluble core material is used, and it may be either water-soluble or oil-soluble one in the case where an oil-soluble core material is used. In the case where a powdery core material is used, a water-soluble one is preferred. However, a polymer substance which causes coagulation of the fine colloidal particles or instabilizes the dispersion system is unfavorable.

Examples of the water-soluble polymer substances are polyvinyl alcohol, polyvinyl pyrrolidone, polyacrylamide, poly(meth)acrylic acid, hydroxypropyl cellulose, dextrin, chitosan, carrageenan, hyaluronic acid and gelatin. Examples of the oil-soluble polymer substances are polymethyl (meth) acrylate, polyethyl (meth) acrylate, polybutyl (meth) acrylate and polystyrene. The above substances were merely mentioned for the purpose of exemplification. These substances may be used either singly or in combination. The amount of the polymer substance used is decided according to the desired release rate of the core material within the range where stability of the dispersion system is maintained, but usually said substance is preferred to be used in such an amount that the content thereof in a microcapsule will become 0.001 to 50 wt %, especially 0.01 to 30 wt %.

When a reactive monomer and/or prepolymer used along with the core material is polymerized into a high polymeric substance to adjust the release rate of the core material, the reactive monomer and/or prepolymer used is preferably water-soluble one in the case of a water-soluble core material, may be either water-soluble or oil-soluble one in the case of an oil-soluble core material and is preferably water-soluble one in the case of a powdery core material. However, the substance which causes coagulation of the fine colloidal particles or instabilizes the dispersion system is unfavorable.

Examples of the water-soluble reactive monomers and/or prepolymers usable here are dimethylolurea, trimethylolmelamine, urea-formaldehyde resin oligomer, melamine-formaldehyde resin oligomer, oligo N-methylol acrylamide (polymerized by reducing the pH below 4 simultaneously with or after encapsulization), oligo vinyl alcohol (crosslinked by a boron compound), ethylene glycol and ethylenediamine (polymerized by a polyvalent isocyanate). Examples of the oil-soluble reactive monomers and/or prepolymers are hexamethylene diisocyanate, isophorone diisocyanate, toluene diisocyanate, 4,4'-diisocyanate diphenylmethane, polymethylenephenyl isocyanate (urethane prepolymer), oligo glycidyl (meth)acrylate, and epoxy resin oligomer (polymerized by polyhydric alcohol or polyvalent amine). The above substances were merely mentioned by way of exemplification. The amount of the reactive monomer and/or prepolymer used is decided according to the desired release rate of the core material within the range where stability of the dispersion system is maintained, but usually said substance is preferred to be used in such an amount that the content thereof in the microcapsule will become 0.001 to 60 wt %, especially 0.01 to 50 wt %.

A clathrate of the core material can be easily obtained by a known method for forming a clathrate. As the host compound used for forming a clathrate of the core material, there can be mentioned, for example, α-, β- or γ-cyclodextrin, cyclophane and crown ether. The amount of the host compound used is decided by the bond constant of the clathrate. The clathrate of the core material may be encapsulated in admixture with said polymer substance or with the reactive monomer and/or prepolymer.

Then, the primary dispersion is further dispersed in an organic solvent (oil medium) containing a dispersant to form a W/O emulsion in case where the core material is a water-soluble material, a W(S)/O emulsion in case where the core material is a powdery material, or an O/W/O emulsion in case where the core material is an oil-soluble material. These emulsions are hereinafter referred to as "secondary dispersion".

Any type of solvent which is generally called hydrophobic solvents may be used as the organic solvent. For example, may be mentioned aliphatic solvents such as $C_6$–$C_{12}$ hydrocarbons, especially n-hexane, n-heptane, n-octane and the like; aromatic solvents such as benzene, toluene, xylene and the like; halogenated solvents, generally chlorinated solvents, such as chloroform, dichloromethane, tetrachloromethane, mono- or dichlorobenzene and the like.

These solvents may be used either singly or in combination. The amount of the organic solvent may be freely selected as far as the obtained emulsion becomes W/O type, W(S)/O type or O/W/O type, but preferably the solvent is used in such an amount that the content thereof in the emulsion will become 25 vol% or greater, especially 40 to 90 vol %.

As the dispersant, there can be used the nonionic surfactant, for example, polyoxyethylene sorbitan trioleate, polyoxyethylene sorbitan monooleate, polyoxyethylene sorbitan monolaurate, polyoxyethylene sorbitan tristearate, polyoxyethylene sorbitan monostearate, sorbitan trioleate, sorbitan monooleate, sorbitan tristearate, sorbitan monostearate, sorbitan monopalmitate, polyoxyethylene alkyl ether, polyoxyethylene alkylphenyl ether and the like, and/or phospholipids such as (hydrogenated) soybean lecithin, (hydrogenated) yolk lecithin and the like, and/or polymer dispersants such as disclosed in Japanese Patent Application Laid-Open (KOKAI) No. 56-135501. The dispersant is used in an amount of 0.01 to 30 wt %, preferably 0.1 to 20 wt %, more preferably 0.2 to 5 wt %, based on the primary dispersion.

The fine colloidal particles in the secondary dispersion are coagulated by using an electrolyte to obtain the microcapsules of this invention. As means for performing coagulation, there can be mentioned a method in which the secondary dispersion is added into an aqueous electrolyte solution or the aqueous electrolyte solution is added into the secondary dispersion. The electrolyte used here is not specified, but the one which does not cause any trouble in application of the obtained capsule particles is preferred. For instance, it is preferred to use a chloride, bromide, nitrate or sulfate of alkali metal, alkaline earth metal, iron, cobalt, nickel, copper, zinc, aluminum or the like, ammonium chloride, tetramethylammonium chloride, or a polyelectrolyte such as polyacrylic acid, polystyrenesulfonic acid, chitosan and the like. It is especially preferred to use an electrolyte which generates polyvalent ions having the charge opposite to that of the fine colloidal particles. The electrolyte is used in an amount sufficient to cause coagulation of the fine colloidal particles (it is enough if the electrolyte is present in higher than critical coagulating concentration in Schulze-Hardy's rule). More specifically, an aqueous electrolyte solution with a concentration of 1 to 50 wt %, preferably 5 to 30 wt % (in case of using a polyelectrolyte, 0.05 to 5 wt %, preferably 0.1 to 1 wt %) is used in an amount of 5 to 500 vol %, preferably 50 to 200 vol %, based on the secondary dispersion.

As for the temperature at which the production process of this invention is carried out, any suitable temperature can be employed provided that it does not cause disorder of the dispersion system. Usually, however, the process is carried out at 20° to 70° C.

When the secondary dispersion is added into the aqueous electrolyte solution or the latter is added into the former, the addition speed may be freely selected provided that it does not break up the emulsion state.

In this way, there are obtained the microcapsules (capsule particles) of this invention in the form of slurry. In case of using the reactive monomer and/or prepolymer, there takes place polymerization simultaneously with encapsulization when the pH is adjusted or a chain-lengthening reagent is added when the secondary dispersion is mixed with the aqueous electrolyte solution. The reactive monomer and/or prepolymer may be polymerized by adjusting the pH or by adding a chain-lengthening reagent after encapsulization.

The polymerization can be accomplished by a known method. In case of effecting the polymerization by adjusting the pH, it is usually preferred to adjust the pH to 4 or below although it may vary depending on the kind of the reactive monomer and/or prepolymer used. In case of using the chain-lengthening reagent, it may be properly selected in accordance with the kind of the reactive monomer and/or prepolymer used. Typical examples of such chain-lengthening reagent are boron compounds such as boric acid and borax, polyvalent isocyanates, polyhydric alcohols, polyvalent amines, urethane prepolymers and the like.

There is no specific limitation in the method for obtaining powdery capsule particles from the slurry-state capsule particles. The powdery capsule particles can, for instance, be obtained by washing the slurry of capsule particles with an alcohol or water, subjecting the washed slurry to solid-liquid separation by suction filtration, and drying the solid obtained. It is also possible to obtain the powdery capsule particles directly from the slurry by spray drying or other means. The size of the capsule particles obtained according to the present invention depends on the dispersing conditions of the secondary dispersion. Usually there are obtained the particles with the sizes ranging from 1 to 500 μm. Thus, it is possible to obtain the capsule particles of a desired size by properly selecting the type and amount of the dispersant used and the stirring conditions (stirring blade diameter, speed, etc.).

According to the process of this invention, there can be produced the desired microcapsules in a high yield under the mild conditions and with simple operations, and even the chemically and/or physically instable core materials can be encapsulated.

Also, the permeability of the core material from the microcapsules can be adjusted as desired by using the polymer substance and/or the host compound forming a clathrate in combination with the core material as the material to be encapsulated. The permeability of the core material from the microcapsules can be also adjusted as desired by conducting encapsulization after forming a clathrate of the core material or by polymerizing the reactive monomer and/or prepolymer used.

Further, in case where a fine colloidal particles of an inorganic compound is used as the fine colloidal particles, since the capsule wall is made of an inorganic substance, there can be obtained the microcapsules having excellent heat and solvent resistance and free of environmental pollution problem.

Thus, the microcapsules and the process for producing them according to the present invention find a very wide scope of utilization.

BEST MODE FOR CARRYING OUT THE INVENTION

Figure 1:
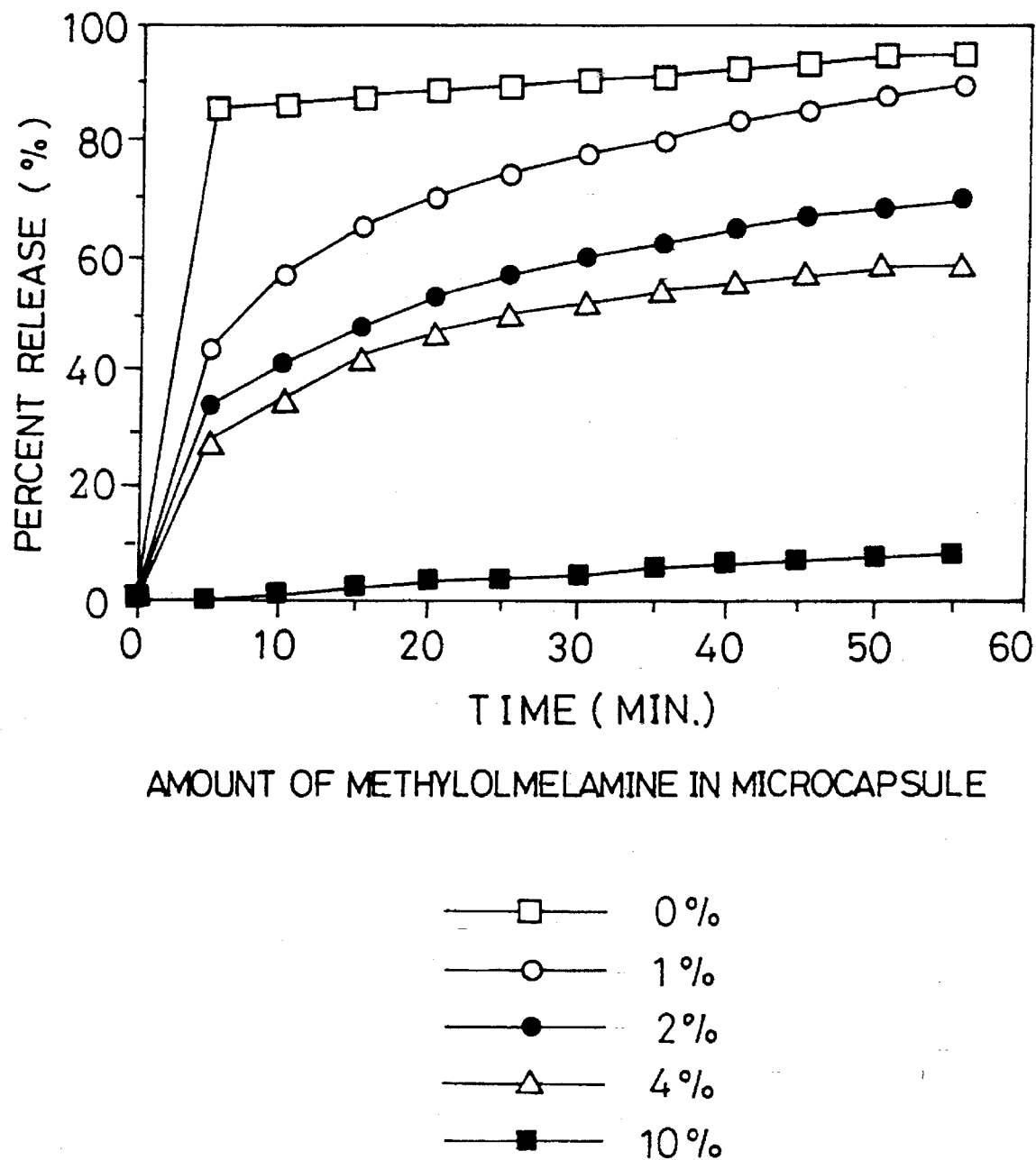
FIG. 1 is a graph showing the release rates of dyes from the microcapsules obtained in Examples B4 to B7.

The present invention will hereinafter be described more particularly with reference to the examples thereof, which examples, however, are merely intended to be illustrative and not to be construed as limiting the scope of the invention.

The yield given in parentheses following the product amount in each Example shows the ratio of the amount of the colloidal particles which formed capsule wall to the total amount of the colloidal particles-used.

EXAMPLE A1

A colloidal solution formed by dissolving 20 mg of dye (Blue No.2) in 16 ml of colloidal silica ($SiO_2$, Snowtex O, particle size: 10 to 20 nm, solid content: 20%) was dispersed in 48 ml of chloroform having dissolved therein 0.2 g of sorbitan trioleate and 2.0 g of polyoxyethylene sorbitan monooleate by using a homogenizer (9,000 rpm., 30 sec.) to prepare a W/O emulsion. Then, 75 ml of a 20 wt % aqueous solution of calcium chloride was put into a 300 ml round flask having a stirrer, and the previously prepared emulsion was added dropwise to said aqueous solution with stirring over a period of about 5 minutes. Stirring was further continued at room temperature for 30 to 60 minutes. To the resultantly obtained slurry of capsule particles (microcapsules), was added 20 ml of methanol, and the capsule particles were filtered out by a suction filter and dried. There were obtained the particles with a bluish appearance. The average particle size was 5 μm and the amount of the particles produced was 2.9 g (yield: 90%).

EXAMPLE A2

An O/W emulsion (primary dispersion) was prepared by dispersing 8 ml of limonene (perfume) having dissolved therein 0.16 g of polyoxyethylene sorbitan trioleate in 16 ml of colloidal silica ($SiO_2$, Snowtex O, particle size: 10 to 20 nm, solid content: 20%). The primary dispersion was then dispersed in 64 ml of chloroform having dissolved therein 0.2 g of sorbitan trioleate and 2.0 g of polyoxyethylene sorbitan monooleate by using a homogenizer (5,000 rpm., 30 sec.) to prepare an O/W/O emulsion (secondary dispersion). This secondary dispersion was put into a 300 ml round flask having a stirrer, and then 24 ml of a 10 wt % aqueous solution of calcium chloride was added dropwise thereto with stirring at room temperature over a period of about 5 minutes. Stirring was further continued at room temperature for 15 to 30 minutes. To the resultantly obtained slurry of capsule particles, was added 20 ml of methanol, and the capsule particles were filtered out by a suction filter and dried. There were obtained the capsule particles having limonene contained therein. The average particle size was 16 μm and the amount of the particles produced was 8.7 g (yield: 85.3%).

EXAMPLE A3

A dispersion was prepared by dispersing 2 g of Red No.226 (organic pigment) in 16 ml of zirconia sol ($ZrO_2$, NZS-30A produced by Nissan Chemical Co., Ltd., particle size: 95 nm, solid content: 35%) by using a supersonic disperser. The dispersion was further dispersed in 48 ml of methylene chloride having dissolved therein 0.6 g of sorbitan monopalmitate and 60 mg of soybean lecithin by using a homogenizer (9,000 rpm., 30 sec.) to prepare a W(S)/O emulsion. This emulsion was put into a 300 ml round flask having a stirrer, and then 24 ml of a 15 wt % aqueous solution of sodium sulfate was added dropwise thereto with stirring at room temperature over a period of about 5 minutes. Stirring was further continued at room temperature for 15 to 30 minutes. To the obtained slurry of capsule particles, was added 20 ml of methanol and the capsule particles were filtered out by a suction filter and dried. The capsule particles red in color having the average particle size of 9 μm were obtained in an amount of 7.2 g (yield: 95%).

EXAMPLE A4

A dispersion was prepared by dispersing 1 g of carbon black in 15 ml of styrene latex (particle size: 120 nm, solid content: 30%) by using a supersonic disperser. The obtained dispersion was further dispersed in 45 ml of hexane having dissolved therein 0.1 g of polyoxyethylene sorbitan monooleate and 0.5 g of sorbitan trioleate by using a homogenizer (8,000 rpm, 20 sec.) to prepare a W(S)/O emulsion. This emulsion was put into a 300 ml round flask having a stirrer, and then 30 ml of a 10 wt % aqueous solution of aluminum sulfate was added dropwise thereto with stirring at room temperature over a period of about 5 minutes. Stirring was further continued at room temperature for 15 to 30 minutes. To the resultantly obtained slurry of capsule particles, was added 20 ml of methanol, and the capsule particles were filtered out by a suction filter and dried. There were obtained the black styrene capsule particles having the average particle size of 22 μm in an amount of 4.9 g (yield: 89%).

EXAMPLE A5

An O/W emulsion (primary dispersion) was prepared by dispersing 1 g of soybean oil having dissolved therein 20 mg of polyoxyethylene sorbitan monooleate in a mixture of 7.5 ml of colloidal silica ($SiO_2$, Snowtex O, particle size: 10 to 20 nm, solid content: 20%) and 7.5 ml of styrene latex (produced by Nippon Kayaku K. K., particle size: 35 nm, solid content: 10%) by using a homogenizer (9,000 rpm, 20 sec.). This primary dispersion was further dispersed in 45 ml of hexane having dissolved therein 0.1 g of polyoxyethylene sorbitan monostearate and 0.5 g of sorbitan trioleate by using a homogenizer (7,000 rpm, 20 sec.) to prepare an O/W/O emulsion (secondary dispersion). This secondary dispersion was put into a 300 ml round flask equipped with a stirrer, and 30 ml of a 10 wt % aqueous solution of aluminum sulfate was added dropwise thereto with stirring over a period of about 5 minutes. Stirring was further continued at room temperature for 15 to 30 minutes. To the resultantly obtained slurry of capsule particles, was added 20 ml of methanol, and the capsule particles were filtered out by a suction filter and dried. There were obtained the capsule particles with a styrene-silica composite capsule wall encapsulating soybean oil. The average particle size was 26 μm and the amount of the particles produced was 2.6 g (yield: 80%).

EXAMPLE A6

A mixed solution was prepared by dissolving 1.0 g of insulin in 10 ml of zirconia sol (NZS-30A, particle size: 95 nm, solid content: 35%) and 6 ml of alumina sol (Colloidal Alumina-100, particle size: 420 nm, solid content: 15%). This mixed solution was dispersed in 60 ml of methylene chloride having dissolved therein 0.1 g of soybean lecithin and 0.5 g of polyoxyethylene sorbitan monopalmitate by using a homogenizer (9,000 rpm, 30 sec.) to prepare a W/O emulsion. This emulsion was put into a 300 ml round flask provided with a stirrer, and 30 ml of a 10 wt % aqueous solution of sodium sulfate was added dropwise thereto with stirring at room temperature over a period of about 5 minutes. Stirring was further continued at room temperature for 15 to 30 minutes. To the resultantly obtained slurry of capsule particles, was added 20 ml of methanol, and the capsule particles were filtered out by a suction filter. The cakes of the capsule particles obtained here were washed well with water and freeze dried. There were obtained the capsule particles encapsulating insulin. The average particle size was 15 μm and the produced amount of particles was 4.9 g (yield: 90%).

EXAMPLE A7

An O/W emulsion (primary dispersion) was prepared by dispersing 3 ml of diazinon (insecticide) having dissolved therein 0.3 g of polyoxyethylene sorbitan trioleate in 30 ml of colloidal silica ($SiO_2$, Snowtex O, particle size: 10 to 20 nm, solid content: 20%). This primary dispersion was further dispersed in 90 ml of chloroform having dissolved therein 0.3 g of sorbitan trioleate and 2.0 g of polyoxyethylene sorbitan monooleate by using a homogenizer (7,000 rpm, 30 sec.) to prepare an O/W/O emulsion (secondary dispersion). This secondary dispersion was put into a 500 ml round flask equipped with a stirrer, and then 50 ml of a 10 wt % aqueous solution of calcium chloride was added dropwise thereto with stirring at room temperature over a period of about 5 minutes. Stirring was further continued at room temperature for 15 to 30 minutes. To the resultantly obtained slurry of capsule particles, was added 20 ml of methanol, and the capsule particles were filtered out by a suction filter and dried. There were obtained the capsule particles encapsulating diazinon. The average particle size was 18 μm and the produced amount of particles was 8 g (yield: 88.9%).

EXAMPLE A8

A colloidal solution formed by dissolving 50 mg of dye (Red No.106) in 16 ml of colloidal silica ($SiO_2$, Snowtex O, particle size: 10 to 20 nm, solid content: 20%) was dispersed in 48 ml of chloroform having dissolved therein 0.2 g of sorbitan trioleate and 2.0 g of polyoxyethylene sorbitan monooleate by using a homogenizer (9,000 rpm, 30 sec.) to prepare a W/O emulsion. This emulsion was put into a 300 ml round flask having a stirrer, and 24 ml of a 5.4 wt % aqueous solution of ammonium chloride was added dropwise thereto with stirring at room temperature over a period of about 5 minutes. Stirring was further continued at room temperature for 30 to 60 minutes. To the resultantly obtained slurry of capsule particles, was added 20 ml of methanol, and the capsule particles were filtered out by a suction filter and dried. There were obtained the particles red in appearance. The average particle size was 12 μm and the amount of the product was 3 g (yield: 90%).

EXAMPLE A9

A dispersion was prepared by dispersing 5 g of aqueous pigment (H Tomicron K, blue, solid content: 20%) in 20 ml of styrene latex (particle size: 120 nm, solid content: 30%). The obtained dispersion was further dispersed in 45 ml of hexane having dissolved therein 0.1 g of polyoxyethylene sorbitan monooleate and 0.5 g of sorbitan trioleate by using a homogenizer (8,000 rpm, 30 sec.) to prepare a W(S)/O emulsion. This emulsion was put into a 300 ml round flask equipped with a stirrer, and 30 ml of a 0.5 wt % aqueous chitosan solution was added dropwise thereto with stirring at room temperature over a period of about 5 minutes. Stirring was further continued at room temperature for 15 to 30 minutes. To the resultantly obtained slurry of capsule particles, was added 20 ml of methanol, and the capsule particles were filtered out by a suction filter and dried. There were obtained the blue styrene capsule particles. The average particle size was 22 μm and the amount of the particles produced was 6 g (yield: 85.7%).

EXAMPLE B1

A colloidal solution formed by dissolving 40 mg of dye (Blue No.2) in 20 ml of colloidal silica (Snowtex O, particle size: 10 to 20 nm, solid content: 20%) and then adding 4 ml of a 5% aqueous solution of polyvinyl alcohol (GOSENOL N-300) was dispersed in 50 ml of chloroform having dissolved therein 0.2 g of sorbitan trioleate and 1.2 g of polyoxyethylene sorbitan monooleate by using a homogenizer (8,000 rpm, 30 sec.) to prepare a W/O emulsion.

This emulsion was put into a 300 ml round flask equipped with a stirrer, and 10 ml of a 20 wt % aqueous solution of calcium chloride was added dropwise thereto with stirring at room temperature over a period of about 5 minutes. Stirring was further continued at room temperature for 15 to 30 minutes. To the resultantly obtained slurry of capsule particles, was added 10 to 20 ml of methanol, and the capsule particles were filtered out by a suction filter and dried. There were obtained the particles with a blue appearance. The average particle size was 11 μm and the amount of the particles produced was 3.6 g (yield: 85.3%). The release rate of the dye into water (at 35° C.) was 65% in one hour. (In case no polyvinyl alcohol was added, the release rate was 100% in 15 minutes.)

EXAMPLE B2

Into a 300 ml round flask equipped with a stirrer, were supplied 45 ml of chloroform, and 30 ml of n-heptane and 1.6 g of sorbitan trioleate and 0.16 g of soybean lecithin were dissolved therein. In the resulting solution, was dispersed a mixture obtained by adding 0.1 g of acetylsalicylic acid and 2 g of a 5% aqueous hydroxypropyl cellulose solution to 30 ml of colloidal silica (Snowtex O, particle size: 10 to 20 nm, solid content: 20%) and mixing them well (stirring speed: 350 rpm). This was followed by dropwise addition of 12 ml of a 20% aqueous solution of calcium chloride at room temperature over a period of about 5 minutes and further stirring at room temperature for additional 15 to 30 minutes.

To the resultantly obtained slurry of capsule particles, was added 10 to 20 ml of methanol, and the capsule particles were filtered out by a suction filter and dried. There were obtained the capsule particles encapsulating acetylsalicylic acid. The average particle size was 40 μm and the amount of the particles produced was 5.7 g (yield: 92.0%). The release rate of the acetylsalicylic acid into water (at 37° C.) was 53% in 6 hours and 81% in 12 hours. (In case no hydroxypropyl cellulose was added, the release rate was 85% in 3 hours.)

EXAMPLE B3

In 20 ml of zirconia sol (NZS-30A, particle size: 90 nm, solid content: 35%), was dissolved 0.25 g of Emulgen 920, and then 5 ml of toluene having dissolved therein 0.05 g of polymethyl methacrylate was dispersed therein to prepare a dispersion (primary dispersion). This primary dispersion was dispersed in 60 ml of n-hexane having dissolved therein 0.25 g of sorbitan trioleate and 1.0 g of polyoxyethylene sorbitan monooleate by using a homogenizer (8,000 rpm, 30 sec.) to prepare an O/W/O emulsion (secondary dispersion).

This secondary dispersion was put into a 300 ml round flask equipped with a stirrer, and 10 ml of a 15 wt % sodium sulfate aqueous solution was added dropwise thereto with stirring at room temperature over a period of about 5 minutes. Stirring was further continued at room temperature for 15 to 30 minutes. To the resultantly obtained slurry of capsule particles, was added 10 to 20 ml of methanol, and the capsule particles were filtered out by a suction filter and dried.

There were obtained the capsules encapsulating toluene. The average particle size was 14 μm and the amount of the capsule particles produced was 10 g (yield: 83.3%). The release rate of the toluene into the air was 9% in 6 hours, 14% in 12 hours and 25% in 24 hours. (In case no polymethyl methacrylate was added, the release rate was 40% in 6 hours and 63% in 12 hours.)

EXAMPLES B4 to B7

Into a 300 ml round flask equipped with a stirrer, were supplied 30 ml of chloroform and 20 ml of n-heptane, and 0.6 g of sorbitan trioleate and 0.06 g of soybean lecithin were dissolved therein. In the resulting solution, was dispersed (at a speed of 350 rpm) each of the mixtures prepared by adding and mixing well 40 mg of dye (Blue No.2) and 0.04 g, 0.08 g, 0.16 g or 0.4 g of a methylolmelamine oligomer (SUMIREZ Resin) in 20 ml of colloidal silica (Snowtex O, particle size: 10 to 20 nm, solid content: 20%).

Then, 10 ml of a 20% calcium chloride aqueous solution of pH 4 was added dropwise thereto at room temperature over a period of about 5 minutes, and stirring was further continued at room temperature for 15 to 30 minutes. To the resultantly obtained slurry of capsule particles, was added 10 to 20 ml of methanol, and the capsule particles were filtered out by a suction filter and dried. The average particle sizes of the respectively obtained capsule particles were 20 μm, 23 μm, 21 μm and 25 μm, and the amounts of the capsule particles produced in the respective cases were 3.6 g, 3.7 g, 3.4 g and 3.4 g (yields: 90%, 92.5%, 85% and 85%). The release rates of the dye into water were as shown in FIG. 1.

EXAMPLE B8

In 30 ml of colloidal silica (Snowtex O, particle size: 10 to 20 nm, solid content: 20%) was dissolved 0.25 g of Emulgen 913, and then 5 ml of a diazinon solution having dissolved therein 0.1 g of polymethylenephenyl isocyanate (CORONATE 3053) was dispersed therein (primary dispersion). This primary dispersion was further dispersed in 75 ml of n-heptane having dissolved therein 0.3 g of sorbitan trioleate and 1.5 g of polyoxyethylene sorbitan monooleate by using a homogenizer (8,000 rpm, 30 sec.) to prepare an O/W/O emulsion (secondary dispersion).

This secondary dispersion was put into a 300 ml round flask equipped with a stirrer, and 10 ml of a 15 wt % aluminum sulfate aqueous solution was added dropwise thereto with stirring at room temperature over a period of about 5 minutes. Then 5 ml of 1% ethylenediamine was added to polymerize the prepolymer. Stirring was further continued at room temperature for 15 to 30 minutes.

To the resultantly obtained slurry of capsule particles, was added 10 to 20 mt of methanol, and the capsule particles were filtered out by a suction filter and dried. The average particle size was 13 μm and the amount of the particles produced was 9.5 g (yield: 86.4%). The release rate of the diazinon into water was 3.5%/hr (as measured by the testing method described in Japanese Patent Application Laid-Open (Kokai) No. 61-249904). (In case no CORONATE 3053 was added, the release rate was 54%/hr.)

EXAMPLE B9

Into a mixture of 12 ml of zirconia sol (NZS-30A, particle size: 95 nm, solid content: 35%) and 6ml of alumina sol (Colloidal alumina-100, particle size: 420 nm, solid content: 15%), was dissolved 0.25 g of methylolurea, and therein was dispersed 4 ml of limonene having dissolved therein 0.16 g of polyoxyethylene sorbitan trioleate (primary dispersion). This primary dispersion was further dispersed in 50 ml of n-hexane having dissolved therein 0.2 g of sorbitan trioleate and 1.2 g of polyoxyethylene sorbitan monooleate by using a homogenizer (8,000 rpm, 30 sec.) to prepare an O/W/O emulsion (secondary dispersion).

This secondary dispersion was put into a 300 ml round flask equipped with a stirrer, and 10 ml of a 10 wt % sodium sulfate aqueous solution of pH 4 was added dropwise thereto with stirring at room temperature over h period of about 5 minutes. Stirring was further continued at 50° C. for 15 to 30 minutes. To the resultantly obtained slurry of capsule particles, was added 10 to 20 ml of methanol, and the capsule particles were filtered out by a suction filter and dried. The average particle size was 18 μm and the amount of the particles produced was 8.0 g (yield: 85.5%). The release rate of the limonene into air was 2% in one day and 5% in 7 days. (In case no methylolurea was added, the release rate was 10% in one day and 95% in 7 days.)

EXAMPLE B10

In 30 ml of colloidal silica (Snowtex O, particle size: 10 to 20 nm, solid content: 20%) was dissolved 0.25 g of Emulgen 913, and therein was dispersed 5 ml of a Sumithion solution having dissolved therein 0.2 g of isophorone diisocyanate (primary dispersion). This primary dispersion was further dispersed in 75 ml of toluene having dissolved therein 1.0 g of sorbitan trioleate and 0.1 g of soybean lecithin by using a homogenizer (7,000 rpm, 30 sec.) to prepare an O/W/O emulsion (secondary dispersion).

This secondary dispersion was put into a 300 ml round flask equipped with a stirrer, and 10 ml of a 20 wt % calcium chloride aqueous solution was added dropwise thereto with stirring at room temperature over a period of about 5 minutes. Then 5 ml of 1% ethylene glycol was added to polymerize the prepolymer. Stirring was further continued at room temperature for 15 to 30 minutes. To the resultantly obtained slurry of capsule particles, was added 10 to 20 ml of methanol, and the capsule particles were filtered out by a suction filter and dried.

The average particle size was 21 μm and the amount of the particles produced was 9.0 g (yield: 80.4%). The release rate of the Sumithion into water was 2.3%/hr (as measured by the testing method described in Japanese Patent Application Laid-Open (Kokai) No. 61-249904). (In case no isophorone diisocyanate was added, the release rate was 49%/hr.)

EXAMPLE B11

Into a mixture of 20 ml of colloidal silica (Snowtex O, particle size: 10 to 20 nm, solid content: 20%) and 10 ml of styrene latex (produced by Nippon Kayaku K. K., particle size: 35 nm, solid content: 10%), was dissolved 0.2 g of Emulgen 920, and therein was dispersed 5 ml of perfume (Rose MIS-7716) having mixed therein 0.5 g of β-cyclodextrin (primary dispersion). This primary dispersion was further dispersed in a solution formed by dissolving 0.9 g of sorbitan trioleate and 0.09 g of soybean lecithin in a mixture of 30 ml of n-heptane and 45 ml of chloroform by using a homogenizer (8,000 rpm, 30 sec.) to prepare an O/W/O emulsion (secondary dispersion).

This secondary dispersion was put into a 300 ml round flask equipped with a stirrer, and 10 ml of a 20 wt % calcium chloride aqueous solution was added dropwise thereto with stirring at room temperature over a period of about 5 minutes. Stirring was further continued at room temperature for 15 to 30 minutes. To the resultantly obtained slurry of capsule particles, was added 10 to 20 ml of methanol, and the capsule particles were filtered out by a suction filter and dried. The average particle size was 22 μm and the amount of the particles produced was 8.1 g (yield: 90%). The release rate of the perfume into air was 1% in one day and 3.5% in 7 days. (In case no β-cyclodextrin was added, the release rate was 8% in one day and 86% in 7 days.)

Industrial Applicability

The microcapsules of the present invention can be produced under the mild conditions and with simple operations. Also, since no chemically active material is used, even the chemically and/or physically instable core materials can be encapsulated. The capsule wall can be freely selected from inorganic wall, organic wall and inorganic/organic composite wall according to the purpose of use of the microcapsules.

Also, it is possible in the microcapsules of the present invention to adjust, as desired, the release rate from the capsules of core material of various types, and thus the microcapsules of the present invention find a wide scope of application.

We claim:

1. A process for producing microcapsules which consists essentially of adding a substance to be encapsulated to a dispersion (hydrosol) of fine colloidal particles in which water is used as dispersion medium, said fine colloidal particles having ζ-potentials on their surfaces, dispersing said dispersion in an oil medium to form an emulsion, and adding a coagulating effective amount of an electrolyte to said emulsion so as to sufficiently neutralize said ζ-potentials and thereby cause coagulation of the fine colloidal particles in said emulsion.

2. A process according to claim 1, wherein the emulsion is a W/O emulsion prepared by adding a water-soluble substance to be encapsulated to a dispersion (hydrosol) of fine colloidal particles in which water is used as dispersion medium, and dispersing said dispersion in an oil medium.

3. A process according to claim 1, wherein the emulsion is an O/W/O emulsion prepared by adding an oil-soluble substance to be encapsulated to a dispersion (hydrosol) of fine colloidal particles in which water is used as dispersion medium to form an O/W emulsion, and dispersing said emulsion in an oil medium.

4. A process according to claim 1, wherein the emulsion is a W(S)/O emulsion prepared by dispersing a water-insoluble powdery substance to be encapsulated in a dispersion (hydrosol) of fine colloidal particles in which water is used as dispersion medium, and dispersing said dispersion in an oil medium.

5. A process according to any one of claims 1, 2, 3 or 4, wherein the hydrosol is a hydrosol of an inorganic compound.

6. A process according to any one of claims 1, 2, 3 or 4, wherein the hydrosol is a hydrosol of at least one substance selected from the group consisting of silicon oxide, zirconium oxide, aluminum oxide, titanium oxide, styrene polymers and acrylic polymers.

7. A process according to any one of claims 1, 2, 3, or 4, wherein the electrolyte is at least one substance selected from the group consisting of chlorides, bromides, nitrates, sulfates and polyelectrolytes.

8. A process according to any one of claims 1, 2, 3 or 4, wherein the substance to be encapsulated is a core material, a combination of the core material and at least one substance selected from the group consisting of a polymer substance, a host compound forming a clathrate, a reactive monomer and a reactive prepolymer, or a clathrate of the core material.

\* \* \* \* \*